United States Patent Office 2,728,768
Patented Dec. 27, 1955

2,728,768

PYRIDAZINE-3-CARBOXAMIDE AND PROCESS FOR PREPARING THE SAME

William J. Leanza, Port Richmond, N. Y., and Edward F. Rogers, Middletown, N. J., assignors to Merck & Co., Inc., Rahway, N. J., a corporation of New Jersey No Drawing. Application March 8, 1952,
Serial No. 275,672

8 Claims. (Cl. 260—250)

This invention is concerned generally with novel 1:2-diazine compounds and with novel processes for preparing the same. More particularly, it relates to pyridazine-3-carboxamide, a new compound posessing anti-tubercular activity, and to processes of preparing this compound starting with 3-hydroxymethyl-pyridazine.

The pyridazine-3-carboxamide, subject of the present invention, can be prepared by reactions which may be chemically represented as follows:

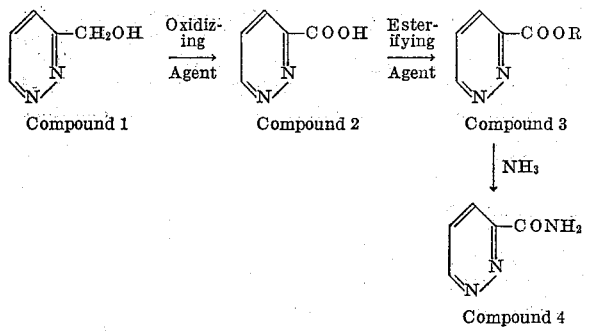

Compound 1   Compound 2   Compound 3

↓ NH₃

Compound 4 wherein R is an alkyl radical.

The reactions, indicated hereinabove, are conducted as follows: 3-hydroxymethyl-pyridazine (compound 1) is reacted with an oxidizing agent thereby forming pyridazine-3-carboxylic acid (compound 2); the latter compound is reacted with an esterifying agent to produce an alkyl pyridazine-3-carboxylate (compound 3), and said alkyl pyridazine-3-carboxylate is reacted with ammonia to produce pyridazine-3-carboxamide (compound 4).

The oxidation of 3-hydroxymethyl-pyridazine to produce pyridazine-3-carboxylic acid can be conducted utilizing any of the oxidizing agents ordinarily employed for the oxidation of methylols to carboxylic acids, as for example, permanganates, chromates, dichromates, nitric acid and the like. We ordinarily carry out this oxidation reaction utilizing, as the oxidizing agent, an alkali metal permanganate or an alkaline earth metal permanganate, preferably potassium permanganate. The oxidation reaction is conveniently conducted in an aqueous medium, and we ordinarily prefer to add the 3-hydroxymethyl-pyridazine to an aqueous solution of the oxidizing agent. The method of addition avoids the formation of decomposition products and polymers produced when the oxidizing agent is added to a solution of the 3-hydroxymethyl-pyridazine. We can carry out the oxidation reaction at temperatures within the range from about 20° C. up to about 100° C., but we prefer to utilize a temperature between about 60° C. and 80° C. At this preferred reaction temperature, the oxidation reaction is usually complete in a period of about five to fifteen minutes.

The pyridazine-3-carboxylic acid thus prepared is then brought into intimate contact with an esterification agent, as for example, an alkanolic solution of a mineral acid, such as ethanolic hydrochloric acid, methanolic hydrochloric acid, sulfuric acid in ethanol, sulfuric acid in isopropanol, and the like, thereby forming the corresponding alkyl pyridazine-3-carboxylate. Alternatively, the pyridazine-3-carboxylic acid is converted to the corresponding alkali metal salt and said salt is reacted with an alkyl halide to form the alkyl pyridazine-3-carboxylate or, if desired, the pyridazine-3-carboxylic acid can be reacted with a thionyl halide to produce the pyridazine-3-carboxylyl halide which upon reaction with an alkali metal alcoholate gives the desired alkyl pyridazine-3-carboxylate. When the esterification reaction is carried out employing a lower alkanol, such as methanol, ethanol, isopropanol, and the like, in conjunction with an acid such as hydrochloric acid or sulfuric acid, the reaction is ordinarily conducted by bringing the reactants together and allowing the mixture to stand at a temperature within the range of about 20° C. to about 100° C. for a period of several hours, thereby forming the corresponding alkyl pyridazine-3-carboxylate, such as ethyl pyridazine-3-carboxylate, methyl pyridazine-3-carboxylate, and the like. We prefer to use a relatively large amount of acid (approximately 30–50% by weight of the lower alkanol present), and to conduct the esterification reaction at a temperature within the range of 40° C. to 60° C., under which conditions the reaction is usually complete after a heating period of one to five hours. The alkyl pyridazine-3-carboxylate is conveniently recovered from the acidic, alcoholic reaction mixture by pouring said mixture onto ice, neutralizing the aqueous mixture, and extracting the neutralized mixture with a water-immiscible solvent such as ether. Upon evaporation of the ether there is obtained the desired alkyl pyridazine-3-carboxylate. Alternatively, the acidic, alcoholic reaction mixture is treated with an alkali to neutralize excess acid, and the resulting alcoholic medium is reacted directly with ammonia, without isolating the alkyl pyridazine-3-carboxylate therefrom.

The reaction between the alkyl pyridazine-3-carboxylate and ammonia is carried out by bringing the reactants together in a liquid reaction medium, thereby forming pyridazine-3-carboxamide. We ordinarily utilize, as the liquid medium, a lower alkanol such as methanol, ethanol, isopropanol, water, liquid ammonia, and the like. Where the reaction is carried out in an alkanolic reaction medium, the alkyl pyridazine-3-carboxylate, such as ethyl pyridazine-3-carboxylate, methyl pyridazine-3-carboxylate, and the like is dissolved in the lower alkanol, and gaseous ammonia is then passed through the solution, while maintaining the mixture at substantially room temperature, until the pyridazine-3-carboxamide, thus formed, crystallizes from the reaction solution.

The following examples illustrate methods of carrying out the present invention, but it is to be understood that these examples are given for purposes of illustration and not of limitation.

*Example 1*

A solution containing 1.1 g. of 3-hydroxymethyl-pyridazine in 100 cc. of water was added to a solution of 2.2 g. of potassium permanganate in 200 cc. of water. The addition of the aqueous solution of 3-hydroxymethyl-pyridazine to the potassium permanganate solution was carried out over a period of approximately five minutes, while maintaining the temperature of the reaction solution at approximately 75° C. Five minutes after all of the aqueous solution of 3-hydroxymethyl-pyridazine had been added, the purple color of the potassium permanganate had disappeared. The resulting slurry was filtered thereby removing the precipitated manganese dioxide, and the filtered solution was evaporated to a volume of about 15 cc. The concentrated aqueous reaction solution was acidified with hydrochloric acid, and the precipitate which formed was recovered by filtration and dried to give 1.0 g. of pyridazine-3-carboxylic acid; yield approximately 80% of theory. This material was recrystallized from water to give substantially pure pyridazine-3-carboxylic acid; M. P. 201° C.

*Example 2*

Five grams of pyridazine-3-carboxylic acid was added to a solution of 10 cc. of concentrated sulfuric acid in 60 cc. of absolute ethanol, and upon heating the resulting mixture, the pyridazine-3-carboxylic acid dissolved. The resulting solution was heated under reflux for a period of about one hour, and was then allowed to stand at room temperature for a period of about fifteen hours. The reaction mixture was poured onto 200 g. of ice, excess potassium carbonate was added to the cold aqueous mixture, and the resulting slurry was extracted with three 200cc.-portions of ether. The ethereal extracts were combined and evaporated in vacuo to give crude ethyl pyridazine-3-carboxylate which was obtained in the form of a waxy solid. This material was recrystallized from benzene-petroleum ether to give substantially pure ethyl pyridazine-3-carboxylate; M. P. 65° C.

*Example 3*

An alcoholic solution of crude waxy ethyl pyridazine-3-carboxylate, prepared from 5 g. of pyridazine-3-carboxylic acid as described in Example 2 hereinabove, was placed in a vessel fitted with a gas inlet tube. Anhydrous ammonia gas was passed beneath the surface of this solution for a period of about three hours, while maintaining the ammoniacal reaction solution at substantially room temperature. At the end of this period, a crystalline precipitate had formed in the reaction mixture. The reaction mixture was cooled, and the crytsalline precipitate was recovered by filtration and dried to give substantially pure pyridazine-3-carboxamide which was obtained in the form of white crystals; M. P. 186° C.

*Analysis.*—Calc'd for $C_5H_5ON_3$: C, 48.78; H, 4.09. Found: C, 49.17; H, 3.92.

Pyridazine-3-carboxamide was demonstrated to possess activity against experimental murine tuberculosis by the following experimental results, which are compiled from two separate test runs:

In each test run a number of mice of the Barckmann IS-32 strain, average weight 12 to 14 grams, were divided into three groups, one of which (consisting of eight mice in each test run) served as normal, uninfected controls. All of the mice in the other two groups, were infected intraveneously with *M. tuberculosis*, human type, strain 837Rv. One group of these infected mice (consisting of seven mice in each test run) was not treated further, and served as infected controls. The remaining group (consisting of seven mice in test run #1 and of four mice in test run #2) were dosed subcutaneously, once each day, five days per week, with 10 or 20 mg. of pyridazine-3-carboxamide. After a testing period of seven weeks, all of the surviving mice were sacrificed, and examined for gross TB lung involvement which was reported using an arbitrary scale from 0 to 4.0, the value 4.0 corresponding to maximum involvement.

The results of the compilation of these two test runs are summarized in the following table:

| Test Group | Total Number of Mice Tested in Test Runs 1 and 2 | Dosage of Pyridazine-3-Carbox-amide, mg./mouse/day | Number of Survivors After 7 Weeks | Gross TB Lung Involvement |
|---|---|---|---|---|
| Normal Controls | 16 | 0 | 16 | 0.0 |
| Infected Controls | 14 | 0 | 7 | 3.6 |
| Infected Mice | 8 | 10.0 | 8 | 0.4 |
| Treated with Pyridazine-3-Carboxamide | 3 | 20.0 | 3 | 0.0 |

These results shows that, whereas all of the uninfected normal controls survived for the seven-week test period, the mortality of the infected, untreated controls during the same period was 50% of the total number of mice in this group. Although the normal controls were completely free of TB lung involvement, the survivors in the group of infected, untreated controls showed an average gross TB lung involvement of 3.6 on the arbitrary scale where 4.0 represents the maximum involvement.

As contrasted with the foregoing results, all of the infected mice which were treated with pyridazine-3-carboxamide survived the seven-week test period. The gross TB lung involvement of these treated mice was found to be only 0.4 on the arbitrary scale for mice in the groups dosed with 10 mg. of pyridazine1carboxamide per mouse per day, and 0.0 for mice in the group in which the daily dosage was 20 mg. per mouse.

Modifications may be made in carrying out the present invention without departing from the spirit and scope thereof. Insofar as these changes and modifications are within the purview of the annexed claims, they are to be considered as part of our invention.

We claim:

1. Pyridazine-3-carboxamide.
2. The process which comprises reacting 3-hydroxymethyl-pyridazine with an oxidizing agent selected from the group which consists of permanganates, chromates, dichromates and nitric acid to produce pyridazine-3-carboxylic acid, reacting this compound with an esterifying agent to produce the corresponding ester of pyridazine-3-carboxylic acid, and reacting said ester with ammonia, thereby producing pyridazine-3-carboxamide.
3. The process which comprises reacting 3-hydroxymethyl-pyridazine with an oxidizing agent selected from the group which consists of permanganates, chromates, dichromates and nitric acid to form pyridazine-3-carboxylic acid, reacting this compound with a lower alkanol in the presence of a mineral acid, thereby forming the corresponding alkyl pyridazine-3-carboxylate, and reacting the latter compound with ammonia to produce pyridazine-carboxamide.
4. The process which comprises reacting 3-hydroxymethyl-pyridazine with potassium permanganate, said reaction being carried out by heating the reacants together in an aqueous medium at a temperature of about 75° C., thereby forming pyridazine-3-carboxylic acid, heating said pyridazine-3-carboxylic acid with absolute ethanol in the presence of sulfuric acid to produce ethyl pyridazine-3-carboxylate, and reacting the latter compound with ammonia to form pyridazine-carboxamide.
5. The process which comprises reacting 3-hydroxymethyl-pyridazine with an oxidizing agent selected from the group which consists of permanganates, chromates, dichromates and nitric acid to produce pyridazine-3-carboxylic acid.
6. The process which comprises reacting 3-hydroxymethyl-pyridazine with potassium permanganate, said reaction being carried out by adding an aqueous solution of said 3-hydroxymethyl-pyridazine to an aqueous solution of potassium permanganate while maintaining the temperature of the mixture at about 75° C., thereby forming pyridazine-3-carboxylic acid.
7. The process which comprises reacting an alkyl pyridazine-3-carboxylate with ammonia to produce pyridazine-3-carboxamide.
8. The process which comprises reacting ethyl pyridazine-3-carboxylate with anhydrous ammonia in ethanol to produce pyridazine-3-carboxamide.

References Cited in the file of this patent

Beilstein Vierte Auflage, vol. 25, page 125.
Richter: Textbook of Org. Chem., pp. 186 and 187 (1938 ed.).